Aug. 1, 1967

N. H. COHAN 3,333,300

MOLD STRUCTURE FOR PLASTIC ARTICLES HAVING
A CYLINDRICAL OUTER SURFACE

Filed July 1, 1966

INVENTOR.
NORMAN H. COHAN

BY John Cyril Malloy

ATTORNEY.

भारत # 3,333,300
MOLD STRUCTURE FOR PLASTIC ARTICLES HAVING A CYLINDRICAL OUTER SURFACE

Norman H. Cohan, Miami, Fla., assignor of fifty percent to Fredric Wise
Filed July 1, 1966, Ser. No. 562,244
9 Claims. (Cl. 18—42)

This invention pertains to injection molding of plastic articles having a cylindrical outer surface, and, more particularly, to a mold structure which provides a mold for making a roller, for example, on the rolling surface of which there is no gate vestige or mold part line.

In the past, different structures than that of the instant invention have been utilized to eliminate a gate on the surface defined by the outer diameter of a molded product; such prior art structures have included (a) a three-plate mold, (b) camming of the runner system, or (c) the use of a submarine mold. The instant invention is of an improved structure and provides for gating means on a molded product which permits the molding of a cylindrically outer surfaced product, such as a roller, without a gate vestige on the outer diameter or rolling surface and at a more favorable and greatly reduced cost basis.

Therefore, one of the principal objects of the present invention is to provide a mold structure which permits of the molding of cylindrically configured molded plastic products having no gate vestige on the outer diameter surface or rolling surface.

Another object of the instant invention is the provision of a gating means in molds for plastic material which channels the injection moldable material under pressure from a runner in the confronting surface of the mold and passage to a mold cavity along the surface of a die extending into a recess which includes the mold cavity and in effect moves the mold part line into the recess of one of the mold sections, so that rollers or the like may be molded and no gate vestige is left on the outer cylindrical surface.

Another object of this invention is to provide a mold structure with two sections which are adapted to be brought into cavity defining relation with one of the sections having a cylindrical recess and with the other section having a die portion to extend snugly into the recess and including a runner recess in the surface of the extending die portion to communicate with and permit passage of flowable plastic materials through a runner defined in the working surfaces of the mold and into the cavity at the floor of the recess and between the distalmost surface of the extending die portion and the floor of the recess as bounded by the wall of the recess.

It is another object of the instant invention to provide a mold structure of the type described in the preceding paragraph and which provides for a molded plastic article which is connected to the runner of the mold through a plastic portion of a smaller cross sectional area than that of the runner in chief.

It is another object of this invention to provide a mold structure for the molding of plastic articles having a smooth cylindrical outer surface with no gate vestige or mold part line which is simple in construction and relatively inexpensive in comparison with prior art mold structures.

In accordance with these and other objects which will become apparent hereinafter, the instant invention will now be described with reference to the accompanying drawings in which:

FIGURE 9 is a view taken along the plane indicated by the line 9—9 of FIGURE 4 and looking in the direction of the arrows.

Figure 1:
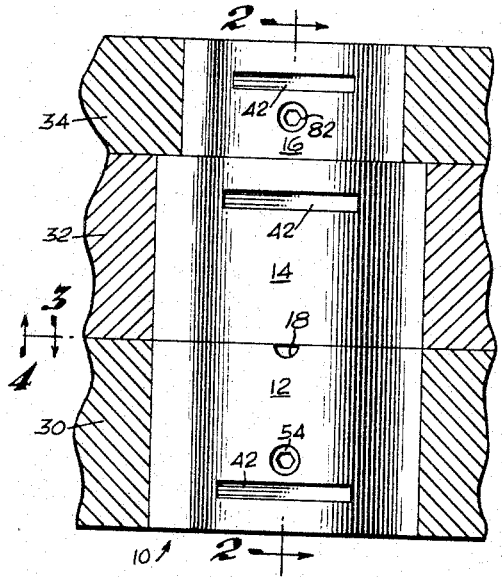
FIGURE 1 is an elevational view of a mold assembly in accordance with the instant invention, the mounting plates for the mold being illustrated in cross section.

Referring to the drawings, wherein like reference characters designate like or corresponding parts throughout the different views, and referring particularly to FIGURE 1, the numeral 10 generally designates the mold assembly, which is composed of a first section 12 and a second section 14 which includes a stripper section 16, preferably, movable relative to the second section. Appropriate runner grooves 18 are provided in the working surfaces of the sections, as in the first section 12, and in open communication with an opening, gate or runner recess 20, which leads or extends vertically from the runner groove into the mold cavity 22 which is completely recessed and spaced well below the main parting plane designated by the numeral 100 and between the recess wall 26 beginning at the plane indicated by the numeral 24.

Figure 2:
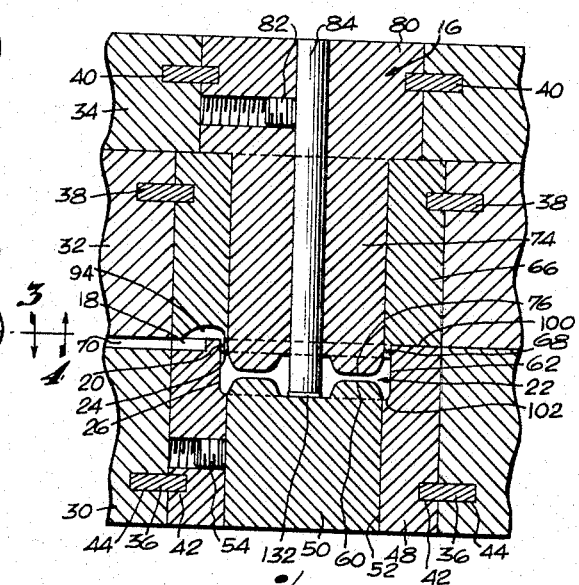
FIGURE 2 is a vertical sectional view taken along the line 2—2 of FIGURE 1 and looking in the direction of the arrows.

As illustrated in FIGURES 1 and 2, the two mold sections 12 and 14 are keyed in respective mounting plates 30 and 32 by means of pairs of keys 36—36 and 38—38 disposed in appropriate key ways 42 and 44 provided in each of the mold sections and mounting plates.

The base or first section 12 of the mold is preferably composed of an open cylindrical portion 48 and a core 50 snugly fitted within the bore 52 thereof. A set screw 54 is provided in the wall of the cylindrical portion 48 to maintain the core 50 in unitary relation shown. The inner face 60 of the core, or as it will be referred to hereinafter, the recess floor 60, is provided with an appropriate configuration to smoothly connect with the wall 26 of the recess. It is noted that the wall 26 of the recess extends from the recess floor 60 as viewed in FIGURE 2 beyond the mold cavity proper to the main parting plane.

The second section 14 of the mold comprises a cylinder 66 of tubular form having an axially extending die portion 68, the inner surface of the die portion being the same as the inner diameter of the cylinder 66 and its outer diameter being sized to fit snugly into the larger inner diameter 62 of the wall 26 of the recess, and extending therein a distance sufficient to provide for the gate or runner recess 20 in the surface of the die portion 68 and to space the cavity portion of the recess away from the parting plane. A feed passage 70 in the mounting plate 30 communicates with the feed passage 18 in the face of the cylinder 48.

The stripper section 16 is keyed to the mounting plate 34 by means of a pair of keys 40. The stripper provides a cylinder 74 snugly yet slidably housed in the bore of the cylinder 66 and provides the distalmost die surface 76 extending outwardly beyond the die portion 68 thereof, into the recess 22 to present a die face in spaced-apart relation to the recess floor 60. An increased diameter foot 80 of the stripper 16 is keyed in the mounting plate 34 and is provided with a set screw 82 which maintains a core pin 84 in position within the bore of the cylinder 74.

The confronting die faces, that is, the floor of the recess and that surface 76 may be of similar or dissimilar configuration and the core pin 84 may be adjustably positioned in abutment with the recess floor 60 or at any spaced relationship therewith. In molding the roller as illustrated, the die faces are of similar configuration and the core pin provides a centrally-disposed through bore for a suitable spindle or shaft.

Figure 3:
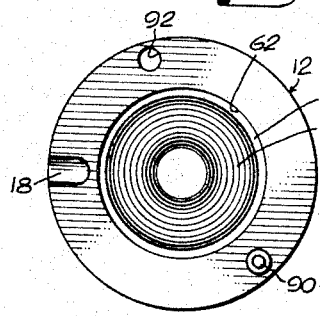
FIGURE 3 is a face view of the bottom section of the plastics mold as viewed along the plane of the line 3—3 of FIGURE 1 and looking in the direction of the arrows.
Figure 4:
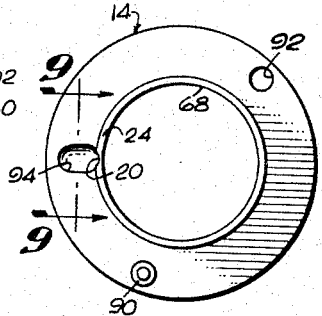
FIGURE 4 is a face view of the intermediate or second section of the plastics mold as viewed along the plane of the line 4—4 of FIGURE 1 and looking in the direction of the arrows.
Figure 5:
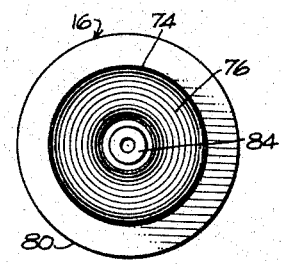
FIGURE 5 is a face view of the top or stripper section of the plastics mold.

As illustrated in FIGURES 3 and 4, the opposed faces, that is, the working surfaces, of the first and second mold sections, may be provided with mating locating pins and apertures or holes 90 and 92. The face of the second mold section 14 is preferably provided with a depression or concavity 94 in the working surface which extends to and slightly beyond the brink of the wall of the recess to communicate flowable plastic material into the gate or runner recess. It will be noted that the effect of this concavity, best seen in FIGURES 9 and 10, at the intersection of the runner 18 and the gate 20 is to provide a portion of the runner which is of an increased cross-sectional area at the brink edge 23 relative to that of the lower end of the gate 20 which is preferably of minimum cross-sectional area. See FIGURE 10, wherein the runner 128 is depicted at its connection to the gate 20′ to include the enlarged intermediate portion 21′ formed by the concavity which connects to the molded plastic product 22′ at the constricted portion at 130 inwardly of the smooth cylindrical roller surface 120. This is also illustrated in FIGURE 9 which is taken in cross section at the pertinent portion of FIGURE 4 and rotated through 90 degrees for convenience of illustration.

It will be seen on reference to FIGURE 2 that the cavity 22 is formed by opposing die faces, the floor 60 and die surface 76, bounded by the wall 26 of the cylinder 48, and the distal end of the die portion 68, as well as the shoulder 102, which is in the lower part of the recess or at the juncture of the recess floor and the wall; into this cavity flowable plastic material is adapted to be forced under pressure for molding.

Figure 6:
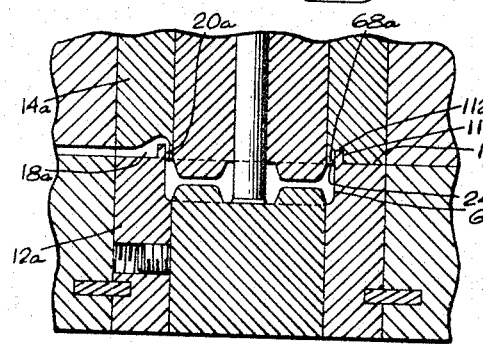
FIGURE 6 is a fragmentary vertical sectional view similar to FIGURE 2, illustrating a somewhat modified form of the instant invention.

In the modified form illustrated in FIGURE 6, the main plane of abutment 100a of the mold sections 12a and 14a is substantially coplanar with the annular flange face 24a; however, the mold base portion 12a is provided with an outwardly projecting annular flange 110, the outer surface of which defines the parting plane 112 and the inner diameter of which is the same as and in fact is an extension of the recess wall 62a of the base mold section 12a. The flange face 110 is sized to snugly fit into a mating annular groove 112 in the confronting face of mold section 14a and the runner or feed passage 18a extends around the annular flange 110 of mold section 12a into communication with the gate passage 20a, in the annular flange 68a, for discharge into the cavity 22a from the face 24a.

Figure 7:
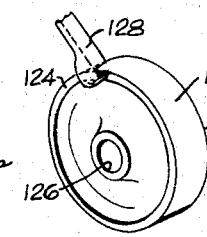
FIGURE 7 is a perspective view of a typical injection molded roller produced in the mold of the present invention with the plastic projection formed in the runner and gate integrally attached to the outer face of the rim thereof.
Figure 8:
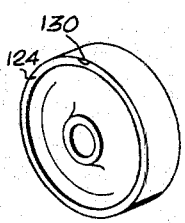
FIGURE 8 is a perspective view of a roller similar to FIGURE 7 with the plastic projection removed.
Figure 10:
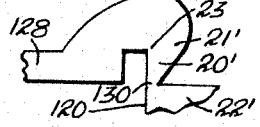
FIGURE 10 is an exaggerated, diagrammatical view of a portion of the flowable plastic material, as opposed to the mold structure, to illustrate a feature of the invention.

FIGURES 7 and 8 illustrate and FIGURE 10 indicates a typical roller, injection molded by the mold assembly of FIGURES 1 through 5 and has an outer diameter or rolling surface 120, axially opposed faces 122 and 124 and an axial bore 126. FIGURE 7 illustrates the plastic 128 formed in the feed passage and gate integrally attached to the face 124 thereof adjacent the rolling surface 120 while FIGURE 8 illustrates the plastic 128 removed with the only vestige remaining in the form of a very small indentation 130 in the face 124, the rolling surface being unblemished.

In operation, the three mold sections are carried into engagement by the mounting plates as illustrated in FIGURES 1 and 2 and a suitable plastic material in a liquid or semiliquid state is injected under pressure through appropriate runners 18, and through the gate or runner recess 20, and into the cavity 22. When the mounting plate 30 breaks away from the plate 32 the base mold section 12 becomes disengaged from the molded product, leaving it engaged on the core pin 84 which may be provided with a small annular bead at its distal end 132 to insure keeping said product in place. When the mounting plates 32 and 34 are separated, the cylinder 74 is withdrawn through the cylinder bore 66 a distance sufficient to strip the molded product free of the core pin 84. The operation of the embodiment of FIGURE 6 is similar as is apparent in view of the foregoing and is not described in the interest of brevity.

It is thus apparent that the molded structure effectively changes the location of the parting plane to space it away from the cavity so that the bearing surface of a roller of the outside diameter of the plastic molded part is smooth, and uninterrupted; free rolling of it is possible by reason of the fact that no gate vestige is left thereon but rather on a side face thereof in a harmless position. Further, it is not necessary to use a three-plate type mold or to cam the runner system; also, to achieve the vestige-free roller surface it is not necessary to use a submarine gate, which goes directly into the molding surface to be cut off by the mold before it is ejected.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. A mold structure with two sections adapted to be brought into cavity-defining relation on relative movement of the sections in a main direction of movement for molding plastic articles of the type having a main body of cylindrical form with the cylindrical surface smooth and free of a gate vestige or mold part line;

said mold structure comprising;

a first and a second mold section, each section having a working surface, which surfaces are adapted, on relative movement of the sections into abutting relation, to define a parting plane with a runner therebetween;

said working surface of said first mold section having a cylindrical recess at the parting plane with the recess wall being smooth and extending depthwise from the parting plane in the direction of relative movement to a recess floor;

said working surface of said second mold section having a main surface of an area sized to completely close the recess at the parting plane and including a die portion extending from the main surface and of a cylindrical cross-sectional area sized to co-cylindrically and snugly fit into the recess to a point of maximum entry when the working surfaces are in tight abutting engagement at the parting plane with the leading edge of the die portion being in spaced-apart relation to the floor of the recess; and the space between (a) the confronting surfaces of said extending die portion and the recess floor and (b) between said smooth wall defining a closed cylindrical mold cavity completely on one side and spaced from the parting plane;

and an intermediate runner recess along and in the cylindrical surface of the die portion to connect at the parting plane with the runner to conduct flowable plastic materials into the cavity in a direction substantially perpendicular to said main surface of said second mold section only and inboard of the outermost periphery of the cavity.

2. A mold structure as set forth in claim 1 wherein said die portion includes a distal configured surface to shape a molded plastic article between smooth cylindrical walls.

3. A mold structure as set forth in claim 1 wherein said cross-sectional area is circular.

4. A mold structure as set forth in claim 1 wherein the minimum cross-sectional area of the plastic flow path through the runner and runner recess is between said parting plane and said cavity.

5. A mold structure as set forth in claim 1 wherein said first mold section includes an annular ring portion to wall the recess with the distal end of the ring portion being in the parting plane.

6. A mold structure as set forth in claim 1 wherein the second section is provided with a recessed gate portion at the parting plane to communicate with said runner recess when the sections are in abutting engagement.

7. A mold structure as set forth in claim 1 wherein said second section is provided with a central recess and a core pin is housed in said second section to extend depthwise to the floor of the recess when the sections are in cavity and runner-defining relation.

8. A mold structure as set forth in claim 1 wherein said second section is provided with an axial through bore of a diameter less than that of said cross-sectional area of said main working surface, and a cylinder slidably and snugly housed within said axial bore and including a die portion on one end and a footed portion on the other end to limit the movement of the cylinder into the axial bore to a predetermined position of projection of the die portion beyond said working surface of said second section.

9. A mold structure as set forth in claim 1 wherein the smooth walls of the cylindrical recess merge and blend with the floor surface through a wall portion and configure the cavity such as the cross-sectional area thereof depthwise of the cylindrical walls is at all points of a progressively smaller cross-sectional area as seen in plan from the parting plane.

References Cited
UNITED STATES PATENTS

| | | | |
|---|---|---|---|
| 2,470,089 | 5/1949 | Booth | 18—30 X |
| 2,578,719 | 12/1951 | Mayer et al. | 18—30 X |
| 2,663,910 | 12/1953 | Danielson et al. | 264—328 X |
| 3,016,579 | 1/1962 | Schlitzkus | 264—328 X |
| 3,031,722 | 5/1962 | Gits | 264—328 X |

J. SPENCER OVERHOLSER, *Primary Examiner.*

E. MAR, *Assistant Examiner.*